US012220370B2

(12) United States Patent
Lindemann

(10) Patent No.: US 12,220,370 B2
(45) Date of Patent: Feb. 11, 2025

(54) LENGTH ADJUSTMENT DEVICE FOR A FINGER MOTION RAIL, LENGTH-ADJUSTABLE FINGER MOTION RAIL, AND THERAPEUTIC DEVICE COMPRISING AT LEAST ONE LENGTH-ADJUSTABLE FINGER MOTION RAIL OF THIS TYPE, AND METHOD FOR LENGTH ADJUSTMENT

(71) Applicant: UNIVERSITAETSmedizin der Johannes Gutenberg-Universitaet Mainz, Mainz (DE)

(72) Inventor: Pascal Lindemann, Mainz (DE)

(73) Assignee: UNIVERSITAETSmedizin der Johannes Gutenberg-Universität Mainz, Mainz (DE)

( * ) Notice: Subject to any disclaimer, the term of this patent is extended or adjusted under 35 U.S.C. 154(b) by 630 days.

(21) Appl. No.: 17/608,806

(22) PCT Filed: May 8, 2020

(86) PCT No.: PCT/DE2020/100391
§ 371 (c)(1),
(2) Date: Nov. 4, 2021

(87) PCT Pub. No.: WO2020/224728
PCT Pub. Date: Nov. 12, 2020

(65) Prior Publication Data

US 2022/0296454 A1 Sep. 22, 2022

(30) Foreign Application Priority Data

May 8, 2019 (DE) ......................... 102019112051.9

(51) Int. Cl.
*A61H 1/02* (2006.01)

(52) U.S. Cl.
CPC ... *A61H 1/0288* (2013.01); *A61H 2201/0192* (2013.01); *A61H 2201/123* (2013.01); *A61H 2201/1635* (2013.01)

(58) Field of Classification Search
CPC .... A61H 1/02–0296; A61H 2201/0192; A61H 2201/0196; A61H 2201/1635;
(Continued)

(56) References Cited

U.S. PATENT DOCUMENTS

2014/0288664 A1 9/2014 Miyazawa
2019/0209412 A1 7/2019 Lindemann
2020/0329794 A1* 10/2020 Luplow .............. A41D 19/0024

FOREIGN PATENT DOCUMENTS

CA 3014681 A1 * 8/2017 ........... A61H 1/0288
CN 105726263 A 7/2016
(Continued)

*Primary Examiner* — Michael R Reid
*Assistant Examiner* — Kira B Daher
(74) *Attorney, Agent, or Firm* — Laurence A. Greenberg; Werner H. Stemer; Ralph E. Locher

(57) ABSTRACT

A length adjustment device for a finger motion rail of a therapeutic device, a finger motion rail having such a length adjustment device, a therapeutic device having such a finger motion rail, and a method for adjusting the length of a finger motion rail on a therapeutic device for carrying out a continuous, passive and/or actively assisted movement of a finger and/or a thumb of a hand. The length adjustment device and adjustment method having a finger motion rail that is automatically moved along an adjustment rail by a drive on a therapeutic device and allows the finger motion rail to be fixed on the adjustment rail and therefore on the therapeutic device at a desired position in order to then be able to carry out a continuous, passive and/or actively assisted movement of a finger and/or of a thumb of a hand in a stable position.

17 Claims, 4 Drawing Sheets

(58) Field of Classification Search

CPC ...... A61H 2201/123; A61H 2201/1215; A61H 2201/1418; A61H 2201/149; A61H 2201/1638; A61H 2201/165; A61H 2201/1664; A61H 2201/1676; A61H 2201/1207; A61H 2205/065; A61H 2205/067; A63B 23/16; A63B 2225/09; A63B 2225/096; A63B 21/157; B25J 15/08; B25J 15/083; B25J 15/02; F16H 31/007; F16H 31/008; F16D 2011/006; F16D 11/08; F16D 11/16; F16D 41/21

See application file for complete search history.

(56) References Cited

FOREIGN PATENT DOCUMENTS

| | | | | |
|---|---|---|---|---|
| CN | 108814898 | A | 11/2018 | |
| DE | 112017000012 | B4 | 7/2018 | |
| DE | 102019112049 | A1 | 11/2020 | |
| JP | 2011115248 | A | 6/2011 | |
| KR | 20190011926 | A | 2/2019 | |
| WO | WO-2016168054 | A1 * | 10/2016 | ............. F16D 11/16 |
| WO | 2017140302 | A2 | 8/2017 | |

* cited by examiner

LENGTH ADJUSTMENT DEVICE FOR A FINGER MOTION RAIL, LENGTH-ADJUSTABLE FINGER MOTION RAIL, AND THERAPEUTIC DEVICE COMPRISING AT LEAST ONE LENGTH-ADJUSTABLE FINGER MOTION RAIL OF THIS TYPE, AND METHOD FOR LENGTH ADJUSTMENT

FIELD AND BACKGROUND OF THE INVENTION

The present invention relates to a length adjustment device for a finger motion rail of a therapeutic device for carrying out a continuous, passive and/or actively assisted movement of a finger and/or a thumb of a hand; a finger motion rail for carrying out such a movement, comprising a length-adjustment device of this type; and a therapeutic device for carrying out a continuous, passive and/or actively assisted movement of at least one finger and/or a thumb of a hand, comprising at least one such finger motion rail.

In addition, the present invention also relates to a method for adjusting the length of a finger motion rail on a therapeutic device for carrying out a continuous, passive and/or actively assisted movement of at least one finger and/or a thumb of a hand.

Therapeutic devices with finger motion rails for the automated movement of individual and/or multiple fingers of a hand permit controlled joint mobilization regardless of the availability of physiotherapy personnel. By means of automated training that is independent of the time of day and is individually tailored to the respective user, such devices improve the success of the therapy in a cost-effective manner and shorten the recovery time of the user.

A number of therapeutic and training devices of this kind have hitherto become known which differ from one another, inter alia, in the way in which force is automatically exerted on the finger joints of the fingers. JP 2011 115 248 A and US 2014/028 86 64 A1 have disclosed devices for supporting a finger movement, the movement mechanisms of which devices are arranged laterally alongside the respective fingers, such that a restriction of movement caused by resting on the finger is avoided. JP 2011 115 248 A discloses a device for supporting a movement, in particular a finger motion rail, which is intended to be able to place a three-joint region in a naturally flexed posture. By contrast, US 2014/0288664 A1 discloses a finger movement support device which uses sensor technology to determine the user's intention as regards a desired finger movement ("flexion or extension") and then supports this movement with the aid of piezoelectric drives arranged on each phalanx.

However, on account of their design principle, both devices can be adapted only inadequately to the differentiated anatomical shapes of the fingers or thumbs of different patients, as a result of which the automated movement of the fingers carried out by them can deviate to a relatively large extent from a natural movement.

In this connection, a portable exoskeleton training robot for rehabilitation of the hand has been disclosed by CN 105 726 263 A. This training robot comprises a fixing device for the hand, which device can be secured to the back of the hand and to the wrist, and rehabilitation devices for the fingers and for the thumb. The rehabilitation devices are each driven by linear motors. To adapt the training robot to the anatomical conditions of the respective user, CN 105 726 263 A proposes threaded rods, which permit at least one manual length adjustment for each individual rehabilitation device.

To improve this, DE 11 2017 000 012 B4 has disclosed a therapeutic device for carrying out a continuous, passive and/or actively assisted movement of the fingers and the thumb of the hand of a patient, which allows each selected finger to be provided with its own finger motion rail with kinematics of movement, which finger motion rail, arranged to the side of the finger that is to be treated, allows the latter an unimpeded flexion and/or extension movement. The known finger motion rail is based on a carriage/rail movement kinematics, which permits an automated finger movement that comes very close to an anatomically natural finger movement. Alternatively, DE 10 2019 112 049.7 describes a finger motion rail or a therapeutic device whose kinematics of movement comprise a multi-joint hinge as a means for flexing a metacarpophalangeal joint and is therefore particularly robust against the action of axial forces and torsional forces on the finger motion rail. Reference is hereby expressly made in full to the principles of movement of both of the aforementioned publications.

With all such therapeutic devices, it is necessary, before training begins, for the device, in particular the individual finger motion rails, to be adapted to the respective anatomy, that is to say to the hand size and/or the individual finger dimensions. For this purpose, the individual finger motion rails are in most cases secured manually to the upper shell or holder of the respective therapeutic device in the optimal position for the respective user, and the finger motion rails must then be released manually after a training session and manually reattached at another place for the next user. This procedure is time-consuming and, in everyday clinical practice, has the disadvantage of shortening the training time available to the respective user with the therapeutic device.

SUMMARY OF THE INVENTION

The object of the present invention is therefore to make available a device and a method with which a finger motion rail or a corresponding therapeutic device is adapted quickly and in an automated and cost-effective manner to the anatomy of the respective user.

This object is achieved by a length adjustment device for a finger motion rail of a therapeutic device for carrying out a continuous, passive and/or actively assisted movement of a finger and/or a thumb of a hand, having the features of the claims; by a finger motion rail for carrying out a continuous, passive and/or actively assisted movement of a finger and/or a thumb of a hand, having the features of the claims; by a therapeutic device for carrying out a continuous, passive and/or actively assisted movement of at least one finger and/or a thumb of a hand, having the features of the claims; and by a method for adjusting the length of a finger motion rail on a therapeutic device for carrying out a continuous, passive and/or actively assisted movement of at least one finger and/or a thumb of a hand, having the features of the claims. Advantageous embodiments and developments that can be used individually or in combination with one another are the subject matter of the dependent claims.

A length adjustment device according to the invention comprises:

at least one adjustment rail;

at least one holding means, movable with respect to the adjustment rail, for holding the finger motion rail;

at least one first blocking mechanism, arranged on the holding means, for blocking the movement of the holding means in a first direction along the adjustment rail;

at least one second blocking mechanism, arranged on the holding means, for blocking the movement of the holding means in a second direction along the adjustment rail;

at least one carriage, wherein the carriage can be operatively connected to the finger motion rail via at least one connecting element;

wherein the carriage is configured to be moved along the adjustment rail by means of a drive for moving the finger motion rail;

wherein the carriage is designed such that, when it is moved by means of the drive in the first direction along the adjustment rail and contacts the first blocking mechanism, it exerts a force on the first blocking mechanism, such that the first blocking mechanism is released, and the holding means together with the finger motion rail is movable in the first direction by movement of the carriage;

and wherein the carriage is designed such that, when it is moved by means of the drive in the second direction along the adjustment rail and contacts the second blocking mechanism, it exerts a force on the second blocking mechanism, such that the second blocking mechanism is released, and the holding means together with the finger motion rail is movable in the second direction by movement of the carriage.

In a first embodiment of the length adjustment device, the carriage can preferably be operatively connected to the drive directly. In a preferred embodiment alternative to the latter, the carriage can also be operatively connected to the drive indirectly via at least one connecting element. An embodiment in which the carriage can be operatively connected to the drive directly, in particular by a direct operative connection to a spindle of the drive, permits a comparatively simple design of the length adjustment device, whereas an embodiment in which the carriage can be operatively connected indirectly to the drive via at least one connecting element favors a comparatively compact and especially flat design of the length adjustment device.

In a further embodiment, the adjustment rail is preferably a grid track having at least two grid elements. A grid track having at least two grid elements advantageously allows the holding means and thus also the finger motion rail to be locked on the therapeutic device in a simple manner.

It is preferable here that the at least two grid elements protrude from the plane of the adjustment rail substantially in a wedge shape (triangular) and/or a semicircular shape and/or in the form of a Reuleaux triangle. Grid elements that protrude in this way from the plane of the adjustment path advantageously permit positive locking, wherein with a wedge (triangular) shape and/or a semicircular shape and/or the shape of a Reuleaux triangle the effect of the blocking mechanism can be overcome more easily (with less effort), under a force exerted by the carriage, than would be the case for example with grid elements protruding from the plane in a cuboid shape.

Alternatively, the at least two grid elements can also be formed as holes within the adjustment rail. An adjustment rail with holes as grid elements in the sense of a perforated plate advantageously permits a flatter design of the adjustment rail.

In a further embodiment, the holding means preferably has a first side wall for holding the blocking mechanisms and a second side wall for holding the finger motion rail, which walls are connected to each other at least via a base element, as a result of which a substantially U-shaped cross section is formed through which the adjustment rail runs. A substantially U-shaped holding means advantageously permits simple and cost-effective production, depending on the material selected, for example by bending a metal sheet, by injection molding or 3D printing. In addition, such a holding means can be easily moved along the adjustment rail.

In an alternative embodiment, it has proven useful if the adjustment rail comprises a first side wall and a second side wall along its longitudinal axis, wherein the first side wall, the adjustment rail and the second side wall together form a substantially U-shaped cross section, and wherein the holding means is arranged within the substantially U-shaped cross section so as to be movable with respect to the adjustment rail. Such an embodiment advantageously leads to a particularly flat design of the length adjustment device and thus to a small space requirement on a finger motion rail or on a therapeutic device.

According to the invention, an embodiment of the length adjustment device is also preferred in which the blocking mechanisms each have at least one fixing means arranged on the holding means, preferably on the first side wall; a blocking lever articulated on the holding means, preferably on the first side wall, so as to be rotatable via an axis of rotation; and a means for suspension of the blocking lever with respect to the fixing means, wherein the blocking lever is designed such that, when the carriage comes into operative connection with the blocking lever, the blocking lever is rotated from a blocking position to an unblocking position and the holding means is thus movable in at least one direction. Such a blocking mechanism advantageously permits a change in position of the holding means, and of the finger motion rail held by the holding means, along the adjustment rail on the therapeutic device, caused by the carriage and thus by the drive of the finger motion rail.

Alternatively, the blocking mechanisms can also be designed in one piece and be made of a resilient material, in particular spring steel and/or hard rubber. The fixing means and the blocking levers can advantageously be formed from a single piece of resilient material, wherein the blocking levers are arranged at an angle with respect to the fixing means, and the intersection points between the blocking levers and the fixing means can correspond to the axes of rotation. In this embodiment, the suspension means can be replaced by the spring properties of the resilient material itself, in particular the spring steel and/or the hard rubber, as a result of which one component per blocking mechanism can advantageously be omitted and the size of the blocking mechanism can be reduced.

Moreover, an embodiment has proven useful in which the blocking levers in their respective blocking position are operatively connected to the adjustment rail, in particular to the grid elements of an adjustment rail designed as a grid track, and, in their respective unblocking position, are not operatively connected to the adjustment rail, in particular to the grid elements of an adjustment rail designed as a grid track. If the blocking levers are operatively connected to the adjustment rail, in particular to the grid elements of an adjustment rail designed as a grid track, a movement of the holding means along the adjustment rail is advantageously prevented and the finger motion rail is held in a stable and secure position, such that the therapy movement can be carried out safely. If the blocking levers are not operatively connected to the adjustment rail, in particular to the grid elements of an adjustment rail designed as a grid track, the holding means can advantageously be moved along the adjustment rail to any desired position or, in the case of an adjustment rail designed as a grid track, to a position dependent on the grid elements or the holes.

In a further embodiment, it is preferable that the drive is a linear drive, in particular a spindle motor, a pneumatic cylinder, a hydraulic cylinder and/or a cable pull. A linear drive advantageously permits a controlled movement of the carriage and thus both of the finger motion rail during the therapy movement and of the holding means together with the finger motion rail during length adjustment along the adjustment rail.

The present invention also relates to a finger motion rail for carrying out a continuous, passive and/or actively assisted movement of a finger and/or a thumb of a hand, comprising a length adjustment device as claimed.

The present invention moreover relates to a therapeutic device for carrying out a continuous, passive and/or actively assisted movement of at least one finger and/or a thumb of a hand, comprising at least one finger motion rail as claimed.

Finally, the present invention relates to a method for adjusting the length of a finger motion rail on a therapeutic device for carrying out a continuous, passive and/or actively assisted movement of at least one finger and/or a thumb of a hand, which method is characterized in that a connecting element of a finger motion rail, arranged on a holding means, is moved with the aid of a drive and via a carriage along an adjustment rail from an amplitude for a therapy movement to a first or second adjustment range; wherein the carriage, when it is moved by means of the drive in a first direction along the adjustment rail to the first adjustment range and contacts a first blocking mechanism, exerts a force on the first blocking mechanism, such that the first blocking mechanism is released, and the holding means together with the finger motion rail is moved in the first direction by movement of the carriage, and wherein the carriage, when it is moved by means of the drive in a second direction along the adjustment rail to the second adjustment range and contacts a second blocking mechanism, exerts a force on the second blocking mechanism, such that the second blocking mechanism is released, and the holding means together with the finger motion rail is moved in the second direction by movement of the carriage.

A length adjustment device according to the invention or a length adjustment method according to the invention advantageously allows a finger motion rail to be automatically moved along the adjustment rail with the aid of the drive already present on a therapeutic device for the finger motion rail, and for same to be fixed on the adjustment rail and therefore on the therapeutic device at a desired position according to the finger length or hand size/length of the user, in order to then be able to carry out a continuous, passive and/or actively assisted movement of a finger and/or of a thumb of a hand in a stable position. Time-consuming manual adjustment is thereby advantageously avoided.

Additional details and further advantages of the invention are described below with reference to preferred exemplary embodiments and in conjunction with the accompanying drawing.

DETAILED DESCRIPTION OF THE INVENTION

In the following description of preferred embodiments of the present invention, the same reference signs denote the same or comparable components.

Figure 1:
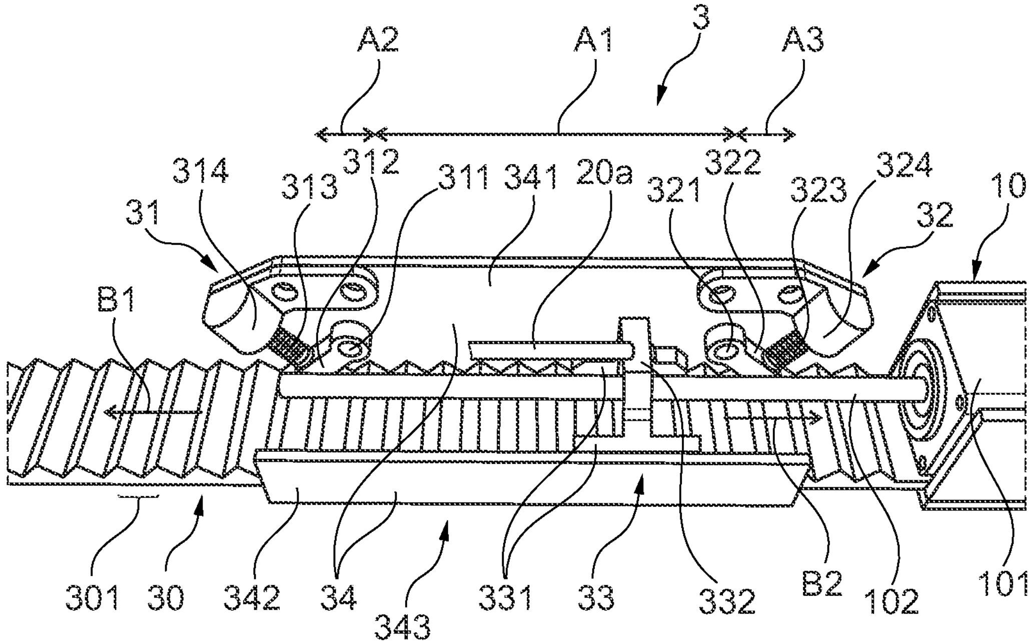
FIG. 1 shows a perspective view of an embodiment of a length adjustment device according to the invention.

FIG. 1 shows a perspective view of an embodiment of a length adjustment device 3 according to the invention. The length adjustment device 3 for a finger motion rail 2 of a therapeutic device 1, for carrying out a continuous, passive and/or actively assisted movement of a finger and/or a thumb of a hand, comprises at least one adjustment rail 30; at least one holding means 34, movable with respect to the adjustment rail 30, for holding the finger motion rail 2; at least one first blocking mechanism 31, arranged on the holding means 34, for blocking the movement of the holding means 34 in a first direction B1 along the adjustment rail 30, and at least one second blocking mechanism 32, arranged on the holding means 34, for blocking the movement of the holding means 34 in a second direction B2 along the adjustment rail 30.

Figure 2:
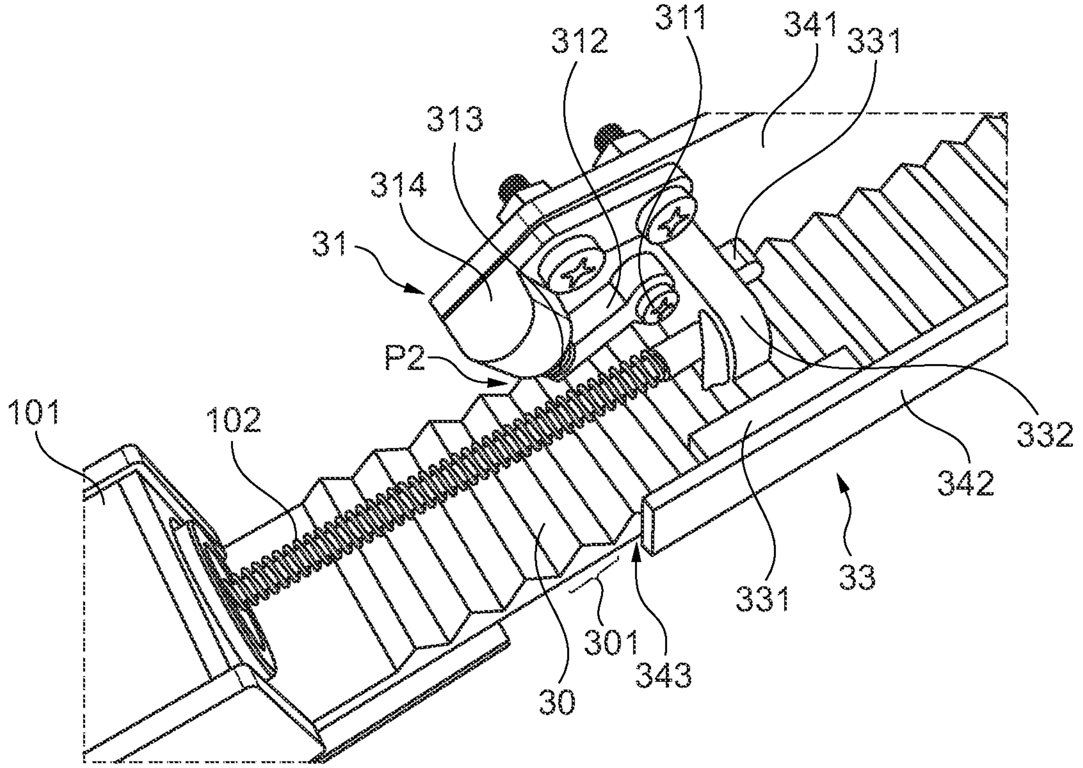
FIG. 2 shows a part of a length adjustment device according to FIG. 1, with a blocking lever in an unblocking position.

FIG. 2 shows a part of a length adjustment device 3 according to FIG. 1, with a blocking lever 312 in an unblocking position P2.

As is shown in FIGS. 1 and 2, the holding means 34 can preferably have a first side wall 341 for holding the blocking mechanisms 31 and 32 and a second side wall 342 for holding the finger motion rail 2, which walls are connected to each other at least via a base element 343, as a result of which a substantially U-shaped cross section is formed through which the adjustment rail 30 runs.

In addition, the length adjustment device 3 according to the invention comprises at least one carriage 33, wherein the carriage 33 can be operatively connected to the finger motion rail 2 via at least one connecting element 20*a*, 20*b* (cf. FIG. 6), and wherein the carriage 33 is configured to be moved along the adjustment rail 30 by means of a drive 10 for moving the finger motion rail 2. As is shown for example in FIGS. 1 and 2, the carriage 33 can for this purpose be operatively connected to the drive 10 directly, in particular by a direct operative connection to a spindle 102 of the drive 10. The carriage 33 is designed according to the invention such that, when it is moved by means of the drive 10 in the first direction B1 along the adjustment rail 30 and contacts the first blocking mechanism 31, it exerts a force on the first blocking mechanism 31, such that the first blocking mechanism 31 is released, and the holding means 34 together with the finger motion rail 2 is movable in the first direction B1 by movement of the carriage 30.

Figure 3A:
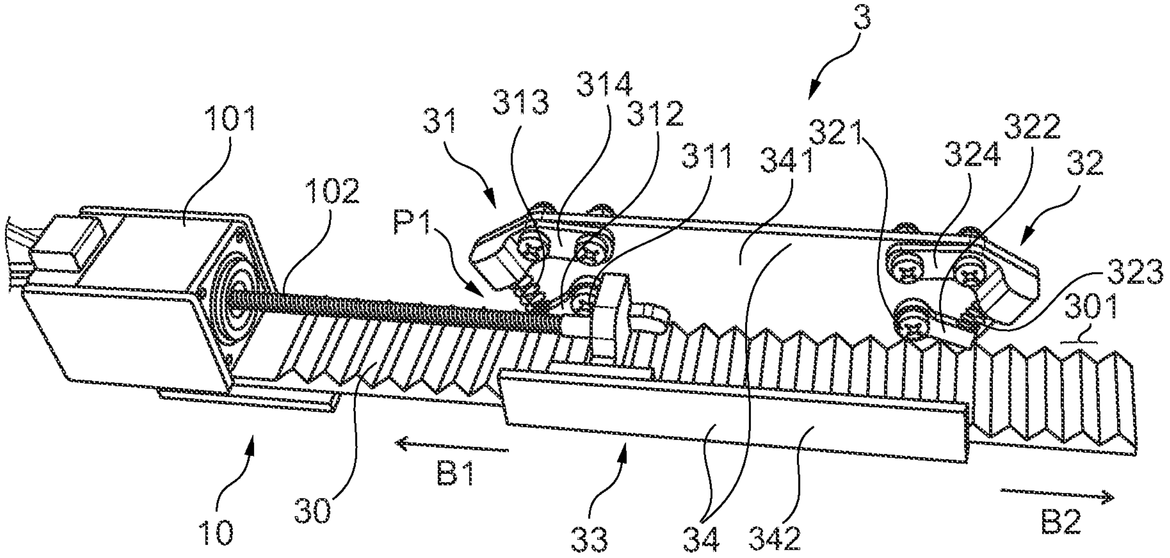
FIG. 3*a* shows the length adjustment device from FIGS. 1 and 2 during the movement in direction B1, wherein a blocking lever of the second blocking mechanism is in a maximally deflected position above a grid element.
Figure 3B:
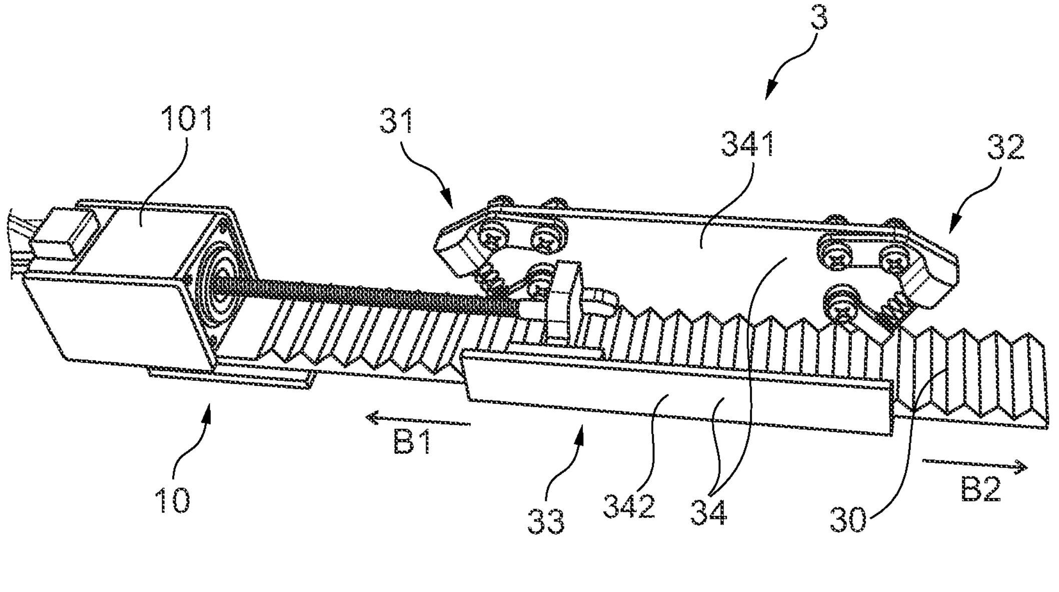
FIG. 3*b* shows the length adjustment device from FIG. 3*a*, in which the blocking lever of the second blocking mechanism is in a minimally deflected position.

FIGS. 3*a* and 3*b* show such a movement of the holding means 34 along the adjustment rail 30 in the first direction B1.

In order to move the holding means 34 along the adjustment rail 30 from an operating position fixed on the adjustment rail 30 to another and thus to adjust the length of the finger motion rail 2, a connecting element 20*a* or 20*b* (cf. FIG. 6) of a finger motion rail 2, arranged on a holding means 34, is moved with the aid of a drive 10, in particular by means of the spindle 102 driven by the motor 101 of the drive 10, and via a carriage 33 along an adjustment rail 30 from an amplitude A1 for a therapy movement to a first A2 or second A3 adjustment range. The carriage 33, when it is moved by means of the drive 10, in particular by means of the spindle 102 driven by the motor 101 of the drive 10, in a first direction B1 along the adjustment rail 30 to the first adjustment range A2 and contacts a first blocking mechanism 31, exerts a force on the first blocking mechanism 31, such that the first blocking mechanism 31 is released, and the holding means 34 together with the finger motion rail 2 is moved in the first direction B1 by movement of the carriage 30. As can be seen in FIG. 2, the blocking lever 312 is moved by a sliding foot 331 of the carriage 33 away from the adjustment rail 30 or the grid elements 31 thereof counter to the spring force of the means 313 of suspension, as a result of which the interaction between blocking lever 312 and adjustment rail 30 is canceled and a movement of the carriage 33 together with holding means 34 and finger motion rail 2 is permitted. In the embodiment shown here, the carriage 33 can comprise two sliding feet 331 and a transverse element 332 connecting the sliding feet 331 to each other, such that the carriage 33 can in particular have an H-shaped configuration in a plan view. The blocking lever 322 of the second blocking mechanism 32 does not block the movement of the holding means 34 in the first direction B1 but can simply be pulled along by the holding means 34 moved by the carriage 33.

FIG. 3*a* shows the length adjustment device 3 from FIGS. 1 and 2 during the movement in direction B1, wherein a blocking lever 322 of the second blocking mechanism 32 is in a maximally deflected position above a grid element 301. FIG. 3*b* shows the same length adjustment device 3, in which the blocking lever 322 of the second blocking mechanism 32 is in a minimally deflected position.

The same applies as regards the movement in an opposite, second direction B2. The carriage 30 of a length adjustment device 3 according to the invention is designed such that, when it is moved by means of the drive 10, in particular by means of the spindle 102 driven by the motor 101 of the drive 10, in the second direction B2 along the adjustment rail 30 and contacts the second blocking mechanism 32, it exerts a force on the second blocking mechanism 32, such that the second blocking mechanism 32 is released, and the holding means 34 together with the finger motion rail 2 is moved in the second direction B2 by movement of the carriage 30. In this case, the carriage 30, when it is moved by means of the drive 10 in a second direction B2 along the adjustment rail 30 to the second adjustment range A3 and contacts a second blocking mechanism 32, exerts a force on the second blocking mechanism 32, such that the second blocking mechanism 32 is released, and the holding means 34 together with the finger motion rail 2 is moved in the second direction B2 by movement of the carriage 33. The exertion of force can also be done here via the sliding foot 331. The blocking lever 312 of the first blocking mechanism 31 does not block the movement of the holding means 34 in the second direction B2 but can simply be pulled along by the holding means 34 moved by the carriage 33.

The adjustment rail 30 can be in particular a grid track having at least two grid elements 301. The at least two grid elements 301 can protrude from the plane of the adjustment rail 30 substantially in a wedge shape (triangular), as shown in particular in FIGS. 1 to 3*b*, and/or a semicircular shape and/or in the form of a Reuleaux triangle. In FIGS. 2, 3*a* and 3*b* it will be seen how the blocking levers 31 and 32 can interact with grid elements 301 protruding in this way from the plane of the adjustment rail 30, such that one blocking lever 31 or 32 in one direction of movement B1 or B2 blocks the movement of the holding means 34 and in the respective other direction of movement can be pulled away over the grid elements 301.

The blocking mechanisms 31 and 32 preferably each comprise at least: a fixing means 314, 324 arranged on the holding means 34, preferably on the first side wall 341; a blocking lever 312, 322 articulated on the holding means 34, preferably on the first side wall 341, so as to be rotatable via an axis of rotation 311, 321; and a means for suspension 313, 323 of the blocking lever 312, 322 with respect to the fixing means 314, 324; wherein the blocking lever 312, 322 is designed such that, when the carriage 33 comes into operative connection with the blocking lever 313, 323, the blocking lever 312, 323 is rotated from a blocking position P1 to an unblocking position P2, and the holding means 34 is thus movable in at least one direction B1, B2. Moreover, the blocking levers 313, 323 in their respective blocking position P1 can be operatively connected to the adjustment rail 30, in particular to the grid elements 301 of an adjustment rail 30 designed as a grid track, and, in their respective unblocking position P2, are preferably not operatively connected to the adjustment rail 30, in particular to the grid elements 301 of an adjustment rail 30 designed as a grid track.

As an alternative to a multi-part design of the blocking mechanisms 31, 32 as described, the blocking mechanisms 31, 32 can also be advantageously designed in one piece and formed from resilient material, in particular spring steel and/or hard rubber.

Figure 4A:
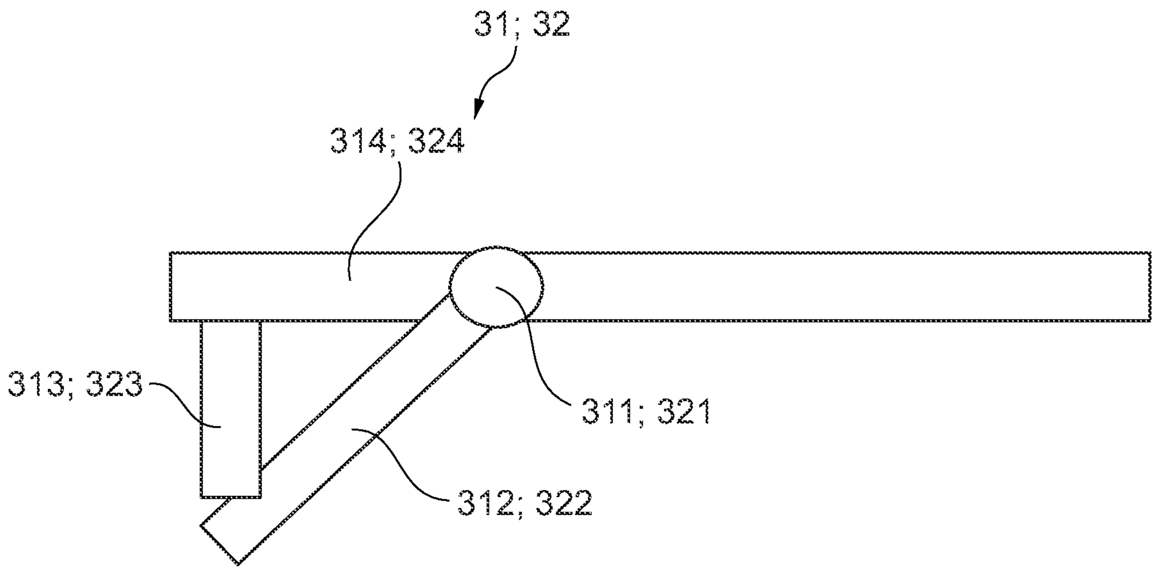
FIG. 4*a*.
Figure 4B:
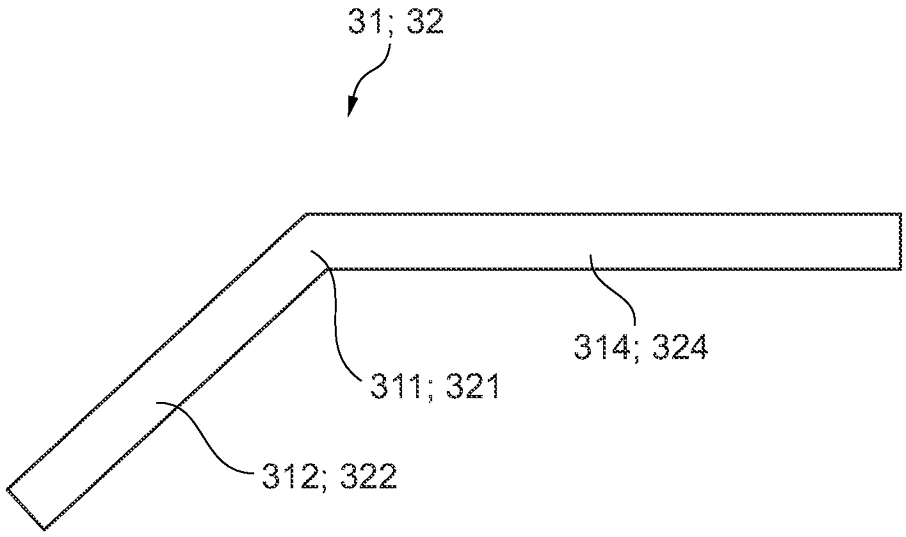
FIG. 4*b* show a schematic comparison of a first, multi-part embodiment of a blocking mechanism according to the invention (FIG. 4*a*) and a second, one-piece design of a blocking mechanism according to the invention, made of spring steel (FIG. 4*b*)

FIG. 4*a* and FIG. 4*b* show a schematic comparison of a first, multi-part embodiment of a blocking mechanism 31, 32 according to the invention (FIG. 4*a*) and a second, one-piece embodiment of a blocking mechanism 31, 32 according to the invention, made of spring steel (FIG. 4*b*). It will be seen that in this embodiment the fixing means 314, 324 and the blocking levers 313, 323 can advantageously be formed from a single piece of resilient material, for example from spring steel and/or hard rubber, wherein the blocking levers 313, 323 are preferably arranged at an angle with respect to the fixing means 314, 324, and the intersection points between the blocking levers 313, 323 and the fixing means 314, 324 can correspond to the axes of rotation 311, 321.

As an alternative to an adjustment rail 30 designed as a grid track having at least two grid elements 301 protruding from the plane of the adjustment rail 30, the at least two grid elements 301 of the adjustment rail 30 designed as a grid track can also be configured as holes within the adjustment rail 30 (not shown).

Figure 5:
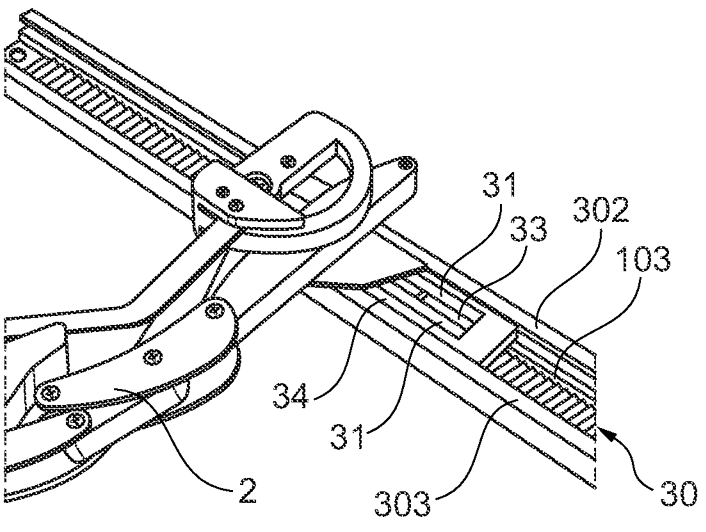
FIG. 5 shows a second embodiment of a length adjustment device according to the invention with a finger motion rail.

FIG. 5 shows a second embodiment of a length adjustment device 3 according to the invention with a finger motion rail 2, in which the adjustment rail 30 preferably comprises a first side wall 302 and a second side wall 303 along its longitudinal axis, wherein the first side wall 302, the adjustment rail 30 and the second side wall 303 together form a substantially U-shaped cross section, and wherein in particular the holding means 34 is arranged within the substantially U-shaped cross section so as to be movable with respect to the adjustment rail 30. To obtain this comparatively compact design, the carriage 33 is here preferably operatively connected to the drive 10 indirectly via at least one connecting element 103 (see also FIG. 6).

Figure 6:
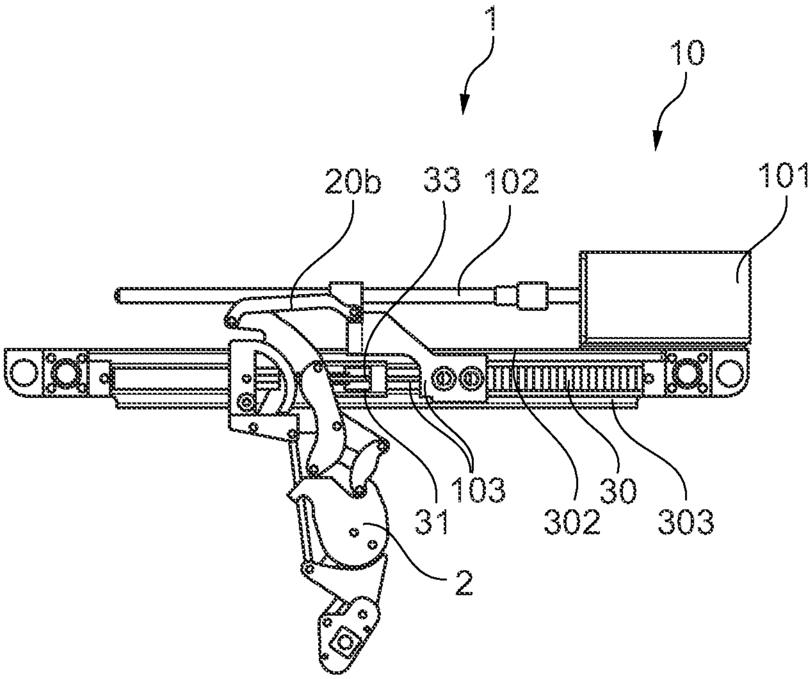
FIG. 6 shows a side view of an embodiment of a finger motion rail with length adjustment device and drive.

FIG. 6 finally shows a side view of an embodiment of a finger motion rail 2 with length adjustment device 3 and drive 10. The drive 10 can preferably be a linear drive, in particular a spindle motor, a pneumatic cylinder, a hydraulic cylinder and/or a cable pull. FIG. 6 shows an example of a drive 10 designed as a spindle motor, of which the motor 101 drives a spindle 102, which in turn interacts with the carriage 33 via at least one connecting element 103. The connecting element 103 can for this purpose preferably comprise at least one portion which runs within the substantially U-shaped cross section formed by adjustment rail 30, first side wall 302 and second side wall 303 (see also FIG. 5 in this connection).

The length-adjustment device 3 according to the invention or the length adjustment method according to the invention advantageously allows a finger motion rail 2 to be automatically moved along the adjustment rail 30 with the aid of the drive 10 already present on a therapeutic device 1 for the finger motion rail 2, and for same to be fixed on the adjustment rail 30 and therefore on the therapeutic device 1 at a desired position according to the finger length or hand size/length of the user, in order to then be able to carry out a continuous, passive and/or actively assisted movement of a finger and/or of a thumb of a hand in a stable position. Time-consuming manual adjustment is thereby advantageously avoided.

LIST OF REFERENCE SIGNS

1 therapeutic device
10 drive
101 motor
102 spindle
103 connecting element
2 finger motion rail
20*a/b* connecting element
3 length adjustment device
30 adjustment rail
301 grid element
302 first side wall
303 second side wall
31 first blocking mechanism
311 first axis of rotation
312 first blocking lever
313 first means for suspension
314 first fixing means
32 second blocking mechanism
321 second axis of rotation
322 second blocking lever
323 second means for suspension
324 second fixing means
33 carriage
331 sliding foot
332 transverse element
34 holding means
341 first side wall
342 second side wall
343 base element
B1 first direction
B2 second direction
P1 blocking position
P2 unblocking position
A1 amplitude for the therapy movement
A2 first adjustment range
A3 second adjustment range

The invention claimed is:

1. A length adjustment device for a finger motion rail of a therapeutic device for carrying out a continuous, passive and/or actively assisted movement of a finger and/or a thumb of a hand, the length adjustment device comprising:

at least one adjustment rail;

at least one holder, movable with respect to said adjustment rail, for holding the finger motion rail;

at least one first blocking mechanism, arranged on said holder, configured for blocking a movement of said holder in a first direction along said adjustment rail;

at least one second blocking mechanism, arranged on said holder, configured for blocking the movement of said holder in a second direction along said adjustment rail;

at least one carriage, said carriage being operatively connected to the finger motion rail via at least one connecting element, and said carriage being configured for movement along said adjustment rail by a drive configured for moving the finger motion rail;

said carriage, when moved by said drive in said first direction along said adjustment rail and contacts said first blocking mechanism, exerts a force on said first blocking mechanism, such that said first blocking mechanism is released, and said holder together with the finger motion rail is movable in said first direction by movement of said carriage; and said carriage, when moved by said drive in said second direction along said adjustment rail and contacts said second blocking mechanism, exerts a force on said second blocking mechanism, such that said second blocking mechanism is released, and said holder together with said finger motion rail is movable in said second direction by movement of said carriage.

2. The length adjustment device according to claim 1, wherein said carriage is operatively connected to said drive directly or indirectly via at least one further connecting element.

3. The length adjustment device according to claim 1, wherein said adjustment rail is a grid track having at least two grid elements.

4. The length adjustment device according to claim 3, wherein said at least two grid elements protrude from a plane of said adjustment rail having a shape selected from the group consisting of a wedge shape (triangular), a semicircular shape, and a Reuleaux triangle shape.

5. The length adjustment device according to claim 3, wherein said at least two grid elements are configured as holes within said adjustment rail.

6. The length adjustment device according to claim 1, wherein:

said holder has a first side wall for holding said first and second blocking mechanisms and a second side wall for holding the finger motion rail;

said first and second side walls being connected to each other at least via a base element; and said first side wall, said base element, and said second side wall are together formed substantially in a U-shape through which said adjustment rail runs.

7. The length adjustment device according to claim 1, wherein:

said adjustment rail has a first side wall and a second side wall along a longitudinal axis of said adjustment rail;

said first side wall, said adjustment rail, and said second side wall are together formed in a substantially U-shape; and said holder is arranged within said substantially U-shape and is movable with respect to said adjustment rail.

8. The length adjustment device according to claim 1, wherein said first and second blocking mechanisms each comprise:

a fixing device arranged on said holder;

a blocking lever articulated on said holder, said blocking lever being rotatable via an axis of rotation;

a device configured to suspend said blocking lever with respect to said fixing device; and said blocking lever, when said carriage comes into operative connection with said blocking lever, being configured to rotate from a blocking position to an unblocking position, and said holder is thereby movable in at least one of said first and second direction.

9. The length adjustment device according to claim 8, wherein said fixing device is arranged on a first side wall of said holder, and said blocking lever is articulated on said first side wall of said holder.

10. The length adjustment device according to claim 8, wherein said first and second blocking mechanisms are each configured as one piece and are formed from a resilient material.

11. The length adjustment device according to claim 8, wherein:

said blocking levers, in their respective blocking position, are operatively connected to said adjustment rail; and said blocking levers, in their respective unblocking position, are not operatively connected to said adjustment rail.

12. The length adjustment device according to claim 11, wherein:

said adjustment rail is configured as a grid track having at least two grid elements;

said blocking levers, in their respective blocking position, are operatively connected to said at least two grid elements of said adjustment rail; and said blocking levers, in their respective unblocking position, are not operatively connected to said at least two grid elements of said adjustment rail.

13. The length adjustment device according to claim 1, wherein said drive is a linear drive.

14. The length adjustment device according to claim 13, wherein said drive is a linear drive selected from the group consisting of a spindle drive, a pneumatic cylinder, a hydraulic cylinder, and a cable pull.

15. A finger motion rail for carrying out a continuous, passive and/or actively assisted movement of a finger and/or a thumb of a hand, comprising a length adjustment device according to claim 1.

16. A therapeutic device for carrying out a continuous, passive and/or actively assisted movement of at least one finger and/or a thumb of a hand, comprising at least one finger motion rail according to claim 15.

17. A method for adjusting a length of a finger motion rail on a therapeutic device for carrying out a continuous, passive and/or actively assisted movement of at least one finger and/or a thumb of a hand, the method comprising:

moving, with the aid of a drive and via a carriage, a connecting element of a finger motion rail arranged on a holder along an adjustment rail by an amplitude for a therapeutic movement to a first or second adjustment range;

when the carriage is moved by the drive in a first direction along the adjustment rail to the first adjustment range and contacts a first blocking mechanism, exerting a force, via the carriage, on a first blocking mechanism, to release the first blocking mechanism, and moving the holder together with the finger motion rail in the first direction by movement of the carriage; and when the carriage is moved by the drive in a second direction along the adjustment rail to the second adjustment range and contacts a second blocking mechanism, exerting a force, via the carriage, on the second blocking mechanism, to release the second blocking mechanism, and moving the holder together with the finger motion rail in the second direction by movement of the carriage.

* * * * *